Aug. 13, 1940.   O. K. KELLEY   2,211,233

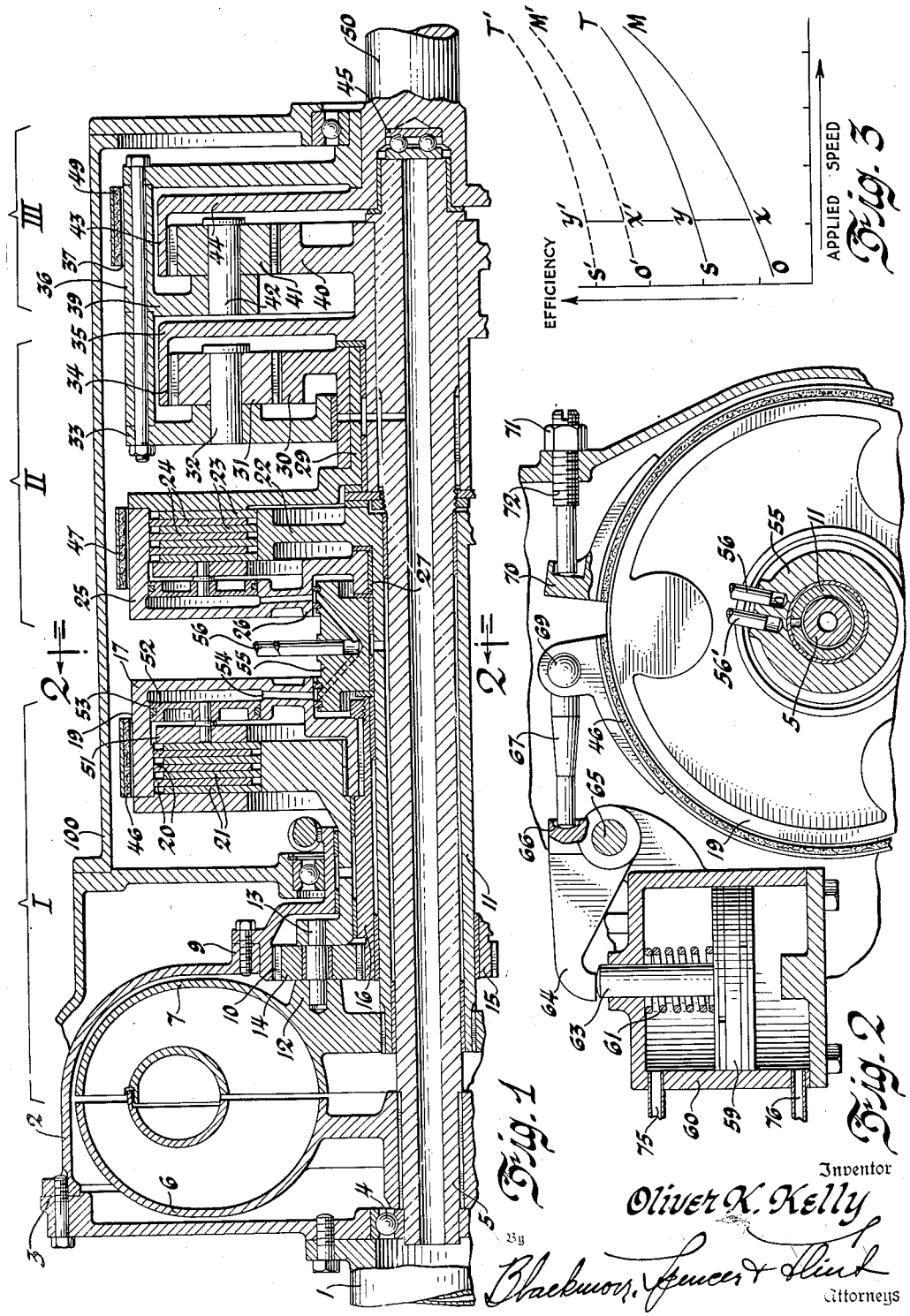

FLUID FLYWHEEL GEARING ARRANGEMENT

Filed April 10, 1939   2 Sheets-Sheet 2

Inventor
Oliver K. Kelly
By
Blackmore, Spencer & Flint
Attorneys

Patented Aug. 13, 1940

2,211,233

UNITED STATES PATENT OFFICE 2,211,233

FLUID FLYWHEEL GEARING ARRANGEMENT

Oliver K. Kelley, Birmingham, Mich., assignor to General Motors Corporation, Detroit, Mich., a corporation of Delaware Application April 10, 1939, Serial No. 267,024

24 Claims. (Cl. 74—189.5)

The present invention relates to gearing arrangements combined with fluid turbines in which combination particular benefits derive from dividing and recombining torque values between a prime mover and a load shaft, as in a vehicle drive.

The invention relates more particularly to multiple step-ratio gearing in such combinations, adapted to yield therein scalar ranges of efficiencies of the fluid turbines so combined, proportional to the multiple speed ratios of the gearing.

A principal object of the invention is to provide forms of gearing in combination which yield not only a low drag torque at low engine speeds when the gearing is set in low ratio, and a high fluid drive efficiency when gearing is set in high ratio, but also which yield minimum gear friction losses when driving in the forward ratios, due to the differential ratio of the multiple gearing being effective only in reverse gear drive.

An additional object is to provide epicyclic gearing combinations of step ratio type in which the principal object is attained.

This is distinct from such forms of combination fluid turbine and multiplex epicyclic gearing in which a differential ratio is utilized in the forward driving couples, and has the advantage of reducing friction losses to a minimum.

A further object of the invention is to provide in the above noted combinations, a primary driving gear ratio for initiating vehicle motion which shall produce a lower net overall reduction ratio than attainable in such combinations wherein the differential low ratio is in the forward driving groups.

A supplementary object is to provide ratio actuation means deriving force externally for actuation, and arranged to yield definite neutral or no-drive until at least two of the ratio actuation elements in separate gear groups are actuated, regardless of the drag couple caused by the compounded rotation of the fluid turbine. This feature is advantageous in the surety of the controls.

Relating to the preceding object is the object of providing a form of ratio control and actuation in which there are no neutral dwells between the step ratios of forward drive, the successively operated ratio actuating means overlapping in such a way as to yield continuous torque during the change interval, with advantages in smoothness and lack of torque shock.

A further object in the above combinations is the provision of a mechanically operating, reaction locking device for establishing and terminating drive in reverse gear ratio, the reverse reaction element being locked for the said differential ratio.

Additional objects and advantages will be apparent in the detailed text following, in which in the accompanying drawings:

Figure 1 is an elevation section of a transmission assembly embodying my invention, the power plant drive being at the left, and the load shaft connecting to vehicle wheels or equivalent drive.

Figure 2 is a section of the structure of Figure 1 taken at 2—2 of that figure, showing the actuation means for the brake device, equivalent to similar devices utilized to actuate the other brakes shown in Figure 1.

Figure 3 is a chart describing the range of efficiencies of the fluid turbo clutch 6—7 of Figure 1, for various conditions of drive as described in the text following.

Figure 4:
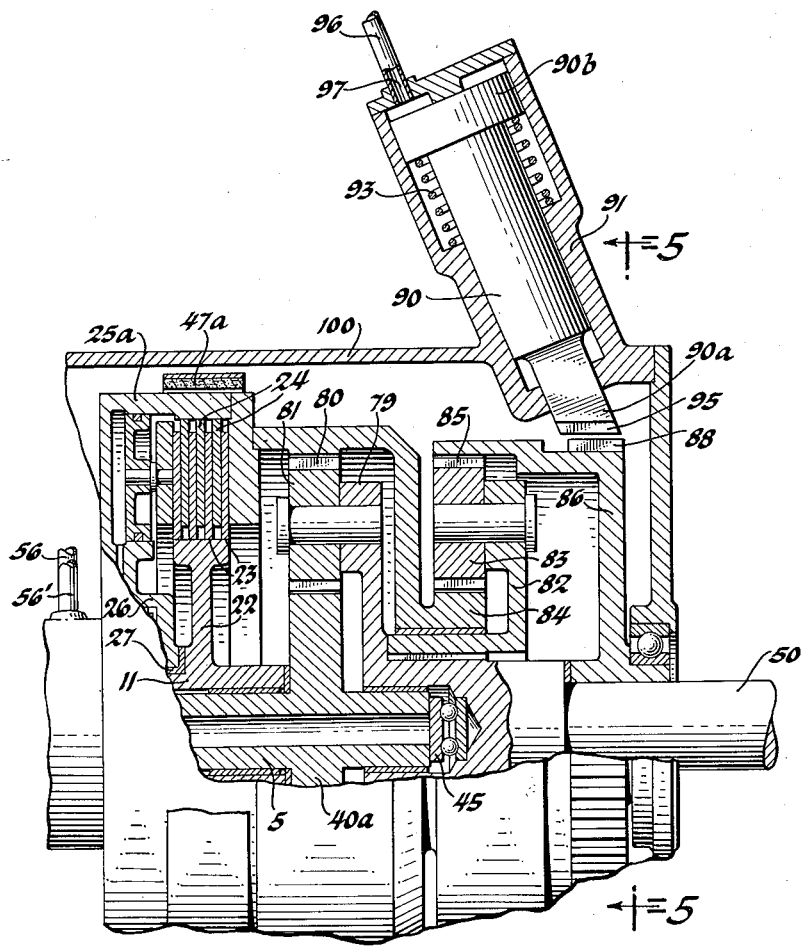
Figure 4 is a vertical elevation in part section of a gear arrangement of the invention differing from the showing of Figure 1 in the method of combining torque and that of obtaining reverse drive.

My disclosure is broadly a combination of controlled selective gearing with the elements of a fluid turbo clutch of the type known as a fluid flywheel, for example, as described in U. S. Patent 1,914,289 to L. H. Pomeroy, but arranged in such a way that for selected changes in speed ratio of the gearing, the efficiency of the fluid turbo clutch increases proportionally; or conversely, the slip factor of said clutch progressively diminishes.

The following specification describes in detail the arrangement wherein such characteristics are provided.

In Figure 1 shaft 1 is the engine or prime mover shaft joined to rotatable casing 2 at 3 by appropriate flange bolts or similar means, the pilot bearing 4 supporting shaft 5 to which is fixed turbo vane wheel 6, mating with complementary turbo vane wheel 7 relatively rotatable to wheel 6.

Casing 2 surrounds and encloses the vane wheels 6 and 7, terminating in flange 9 to which is fixed annulus gear 10.

Hollow shaft 11 surrounds solid shaft 5 for a portion of its length and is attached to planet carrier 12 and vane wheel 7, as a composite structure. Spindles 13 fixed in carrier 12 act as shafts for planet gears 14, meshing with annulus 10, and with sun gear 15 affixed to hollow shaft 16 surrounding shaft 11. The shafting is supported in bearings in casing 100.

Radial drum member 17 attached to shaft 16 is shaped to form a brake surface 19, and also carries a group of clutch elements 20 mating with clutch elements 21 arranged to rotate with carrier 12.

Clutch hub 22 fixed to a rearward extension of shaft 11 serves as a mounting for a group of clutch elements 23 which mate with a group of clutch elements 24 carried by drum 25 integral with web 26, the outer portion of drum 25 being formed into a braking surface. Web 26 is supported on shaft 11 by bearing 27.

Drum 25 is integral with or attached to hollow shaft 29 arranged to rotate with sun gear 30. Planets 31 meshing with sun gear 30 rotate on spindles 32 mounted in carrier 33, and also mesh with annulus gear 34 integral with drum 35 affixed to shaft 5.

Carrier 33 is attached to drum 36 which has external brake surface 37, and web 39 of drum 36 is the carrier for the third group of gears which form the reversing gear means.

Sun gear 40 affixed to shaft 5 meshes with planet gears 41 mounted on spindles 42 rotating with and attached to web 39. Annulus gear 43 integral with drum 44 rotates with the output or load shaft 50, the pilot bearing 45 supporting the end of shaft 5 in shaft 50.

Brake member 46 is effective to lock drum 17 against rotation; brake member 47 may lock drum 25; and brake 49 may likewise prevent rotation of drum 36.

The precedingly described structure, for convenience, will be designated by groups. Unit I consisting of sun gear 15, annulus 10 and planets 14, and associated elements including brake 46 and clutch 20—21, operates such that when brake 46 is applied to drum 17, sun gear 15 serves as the reaction element, whereby rotation of annulus 10 compels rotation of vane wheel 7 at some reduced fractional speed of engine shaft 1. When clutch 20—21 is engaged and brake 46 released, a couple established between carrier 12 and sun gear 15 compels vane wheel 7 to rotate at engine speed. Alternate operation of brake 46 and clutch 20—21 then varies the speed at which vane wheel 7 rotates with respect to engine speed. With neither of brake 46 and clutch 20—21 actuated, there can be no drive transmitted through vane wheels 6—7 and to the remainder of the gearing.

Unit II, consisting of annulus 34, sun gear 30, planets 31 and carrier 33, and associated elements, including brake 47 and clutch 23—24 is the means for obtaining variations in drive between unit I and elements transmitting drive to the load shaft 50. Alternate operation of brake 47 and clutch 23—24 compels speed changes between shaft 5 and shaft 50 as modified by speed changes applied to sun gear 30.

Unit III, consisting of sun gear 40, planets 41, annulus gear 43, and associated elements, including brake 49, serves two purposes; as a reversing gear when brake 49 prevents rotation of drum 36, and as a variable coupling arrangement when brake 49 is released, and torque may flow from the engine connected elements to sun gear 40 and simultaneously to carrier 39, when annulus gear 43 resolves the delivered torque forces. It should be clear that the manipulation of brake 47 and clutch 23—24 affects the operating conditions of both of units II and III, whereas brake 49 in my example, is only used to establish reverse gear drive.

Means are shown to engage and release the various clutches and brakes of my disclosure.

Clutch 20—21 is engaged by presser plate 51 moved by pistons 52 in cylinders 53 integral with drum 17, fed by pressure in passage 54 from gland 55 mounted about shaft 11, receiving fluid pressure through pipe 56, in this example from a controlled external means, also coordinately controlling the operation of brake applying means such as described in Figure 2.

The assembly of parts in Figure 2 is descriptive of the brake applying means required for any of brakes 46, 47 and 49, as an operative example. In the controls for units I and II, brake 46 and clutch 20—21 may be coordinately operated; and brake 47 with clutch 23—24 in the same manner, whereas for unit III, only brake 49 by itself need be effective provided drive is operatively established through unit I. The control means for the entire clutch and gearing disclosure in my present application may be arranged to select actuation or operation for any brake or clutch individually, or in combinations of two brakes, two clutches, a brake and clutch, or any desired pattern of action or release as required to establish controlled variable speed combinations.

Figure 2 shows cylinder 60 in which piston 59 slides, arranged to oppose springs 61 and transfer force to piston rod 63. Springs 61 normally load piston 59 so as to move rocker 64 about pivot 65, and through notch 66 relieve thrust on rod 61 pivoted to the eye 69 of brake band 46, shown as an illustrative example for any of brakes 47 or 49. The anchor end 70 of band 46 may be adjusted by nut 71 on the threaded length of slotted bolt 72.

From an external servo source, through appropriate control means is supplied fluid pressure through port 75, working on the opposite face of piston 59. Fluid pressure in cylinder 60, acting against the other face of piston 59 is likewise supplied through port 76, from the above noted source.

According to the control characteristics desired by the designer, port 75 may be joined externally to pipe 56 so that brake 46 and clutch 20—21 are coordinately operated; that is, when fluid pressure is admitted to both 75 and 56, the brake 46 may be released while fluid pressure is applied to cylinders 53, increasing loading on clutch 20—21 through pistons 52 and pressure plate 51, until brake 46 is released and clutch 20—21 fully engaged. During this change interval fluid pressure may be admitted from the above mentioned source to port 76 of cylinder 60, whereby the torque release interval of brake 46 and the torque capacity of clutch 20—21 may be modified or varied.

When the structure of Figure 2 is applied to the operation of brake 47 and clutch 23—24 of unit II, the external porting 75—76 of cylinder 60 and pipe 56 may be so arranged in sequence of operation with the fluid pressure source that instead of brake release occurring while the clutching action is being established, a neutral dwell in the shift interval may be arranged wherein there is no drive or couple resulting from either brake and clutch action. The same regime may also be followed in the control of brake 46 and clutch 20—21.

In this disclosure, the manner of arrangement of external controls is not germane to the invention herein described, except as is needed to describe an operative structure, the specific disclosure of such controls being detailed in a separate patent specification.

In understanding the advantages of the construction and the operation of my invention it is necessary to examine carefully the showing of Figure 1. When the engine connected to shaft 1 assumed to be idling at low speed, and the load of the vehicle applied to shaft 50, while none of the described brakes and clutches are engaged or applied, it will be apparent that there can be no drive since there is no established fulcrum or reaction between annulus 10 rotating at engine speed and annulus 43 connected to output shaft 50.

Now if engine speed be increased from idling, spinning planets 14 and sun gear 15 by friction drag, the moment a slipping couple is established between vane wheels 6—7 by circulation of oil through the vane passages, shaft 5 will transmit energy to gear 40, and since annulus 43 is stopped, planets 41 will planetate, causing drum 36 to rotate.

If at this point, brake 49 be applied, vane wheel 6 would be subject to an incremental proportion of load torque. Assuming a large value for load torque on shaft 50, and sufficient fluid rotation in the fluid flywheel elements 6—7, vane wheel 7 will tend to stop or decelerate, whereupon annulus 10 fulcruming on the retarded planets 14, would cause sungear 15 and connected parts to spin backward at some speed above engine speed. It is apparent that such residual torque forces are not capable of transmitting drive to shaft 50, and the arrangement thus far described provides no-drive or neutral.

Let it now be assumed that brake 46 only be applied, stopping sungear 15. Engine speed applied to annulus 10 will force vane wheel 7 to rotate ahead at some speed slower than engine speed because of the gear diameter of elements 15, 14 and 10. There can still be no drive to shaft 50, since coupling force delivered from wheel 7 to wheel 6 can only spin carrier 39 and drum 36 which latter have no couple nor reaction by either brake 47 or clutch 23—24.

It will be seen that for torque to flow between the engine and load shaft 50, some couple or reaction is needed in units II and III.

If brake 47 of unit II also be applied, sungear 30 of unit 2 becomes a fulcrum or reaction point. When this be concurrent with the application of brake 46 in unit I, vane wheel 7 must rotate, applying a fluid couple to shaft 5 through wheel 6. Now with annulus 34 and sungear 40 both furnishing a torque component; carrier 32, because of sungear 30 acting as a reactor, and carrier 42 rotating with 32 but receiving a torque component because of the resistance of annulus 43, the resultant rotation of annulus 43 and output shaft 50 is a compound motion wherein torque divided from shaft 5 through gears 34 and 40 is recombined at gear 43 with a mechanical advantage proportional to the incremental ratio factors of the gears of units II and III.

All torque applied to shaft 50 passes through vane wheel 6 and 7, the relative slower speed of wheel 7 to engine shaft 1 providing a slip factor between 6 and 7 at a point on the typical curve of Figure 3 for fluid flywheel devices, where the efficiency is low, as at point X on line OM of that figure.

For a given rotation range of shaft 1 there is an infinite series of X and Y points possible on the above curves. When carrier 14 and sungear 15 are rigidly coupled, causing vane wheel 7 to move at engine speed, the torque transferred through vane wheels 6—7 is represented by some point Y on curve S—T.

It can be assumed for a low ratio setting of unit II, as with the brake 47 set, there will be two drive conditions between shafts 1 and 50, depending on whether in unit I, brake 46 or clutch 20—21 are actuated. These two conditions provide two net speed ratios, unique in that there is a degree of flexibility in the drive, having one slip value, as at X, and another, as at Y. This function is, of course, provided by the variable coupling effect produced between vane wheels 6 and 7, when wheel 7 rotates at engine speed, or at some reduced speed function thereof.

The driving conditions when clutch 23—24 is coupled and brake 46 released, are now considered. The couple thus set up between carrier 12 of unit I and sungear 30 of unit II transfers the rotation of vane wheel 7 to sungear 30 direct; whether wheel 7 is compelled to run at engine speed, or at some reduction gear speed established by locking of brake 46.

The resistance of shaft 50 at annulus 43 sets up these conditions; a torque component derived by vane wheel 6 from rotation of wheel 7 is delivered to sungear 40 of unit III and annulus 34 of unit II; a second torque component through shaft 11, hub 22, clutch 23—24, and sungear 30 is combined with a torque value derived from rotation of annulus 34, resulting in rotation of carrier 32 and drum 33—36, applied to carrier 42. Here the first component delivered at sungear 40 combines with the value at carrier 42 received from the motion of 32 obtained from rotation of annulus 34 and sungear 30 of unit II.

A second group of curves O'—M' and S'—T' represents the two ranges of efficiencies of the fluid coupling means when clutch 23—24 is engaged.

When clutch 20—21 of unit I is coupled under these conditions, the net effect obtained at annulus 43 and at load shaft 50 is direct drive, since the unitary rotation of the rotating parts of unit I provides a drive in which the relative slip between wheels 6 and 7 is de-multiplied by the series-parallel system comprising the gearing of units II and III.

Because of the known increase in efficiency with applied speed of fluid couplings such as vane wheels 6 and 7, the losses in torque in the present disclosure, because of the unique gearing combination, are reduced materially over structures in which the fluid coupling is placed directly between a power shaft and a load shaft.

Furthermore, the novel feature of the combination gearing arrangement of unit I wherein selective control over the relative speed of the driven vane wheel 7 with respect to the engine shaft speed, adds the unusual flexibility to the system which yields the resultants of curves OM and ST of Figure 3, and is a complement to the further ratio range afforded by the controls of unit II wherein resultants of motion at annulus 43 partake of four net forward speed characteristics or ratio ranges, rather than four definite, fixed speed ratios.

In so describing my invention, it appears necessary to stress the fact that the so-called speed ratios made available for drive are not positive, fixed ratios, but in each case are predetermined ratio ranges, within which there are allowances of relative speed in which variation according to engine speed, and driving conditions occur.

To take full advantage of the peculiar characteristics of the so-called fluid fly-wheel, wherein the efficiencies vary so widely over a prime mover speed range, I have so related the fluid elements to selective fixed ratio torque paths than in the low ratio settings the fluid coupling is normally operating on the less efficient portions of its efficiency curve, and in high ratio settings is not only operating on the more efficient portions of its cycle, but also the over-all slip between input and output is de-multiplied because of the novel nature of the split-torque recombining means associated with the coupling at the higher ratio settings.

The controls for the brake and clutch combinations may be manual, speed or torque responsive, or speed and torque responsive as desired, and may be manipulated through relay or similar means according to the user's requirements. No claims for invention in such control combinations are herewith made, the preceding statement simply referring to control methods in which some forms of automatic device may be utilized.

The following table of speed ratios provided by actuation of the designated clutch and brake members herein described represents an operative sequence illustrative of the foregoing description. The capital X in each case indicates which of the members is actuated for a given speed ratio range condition:

|  | Brake 46 | Clutch 20—21 | Brake 47 | Clutch 23—24 | Brake 49 |
|---|---|---|---|---|---|
| Low | X |  | X |  |  |
| 2nd |  | X | X |  |  |
| 3rd | X |  |  | X |  |
| High |  | X |  | X |  |
| Rev | X |  |  |  | X |
| Neutral |  |  |  |  |  |

Note that for a definite neutral or no-drive condition, none of the brakes or clutches are energised.

It is herewith emphasized that my invention as described yields a separate slip characteristic for each setting of transmission ratio controls, and as described, the slip is high for low ratio settings, and low for high ratio settings. In my present example, there are two intermediate forward speeds between low and high, in which as progression upward in ratio occurs, the efficiency of the fluid coupling, by my arrangement likewise increases.

One very important advantage accruing from my arrangement is the softness of the drive in the low speed ratios as compared with ordinary fluid and gear combinations, and the further resultant of progressive efficiency increase as speed ratio changes from the low to the high settings.

Another important feature is the extremely low drag torque at normal engine idling speeds with the transmission units set for low gear. This does away with the phenomenon known as "creep" experienced ordinarily with fluid couplings of this general type. It is a known fact that in a so-called fluid flywheel, when one member is stopped, the drag is proportional to a factor greater than the square law value. In my arrangement, which inherently reduces the speed of the primary rotor of the fluid coupling when set for low gear, the drag torque is thereby reduced by that factor superimposed on the ratio of demultiplication.

Furthermore, whatever drag there may be is not increased by the entire low gear ratio as in commonly known arrangements, but is subject only to multiplication of one portion of the total low gear train. It is therefore evident that the final drag torque delivered to the final drive at engine idling when the transmission is set for low gear is of extremely low value as compared with ordinary series driving arrangements of this character.

Conversely, when the transmission is set for high ratio drive, the fluid coupling is arranged so that the engine torque is delivered through multiple paths, or as is described in this art, is operating through a split-torque arrangement, wherein a part of the input torque flows through the mechanical system, and a part through the fluid coupling. The advantage of this is that the fluid coupling is operating under a relatively light torque, and therefore at higher efficiency.

For convenience, this description will refer to the gearing 10—14—15 as the first group; the gearing 30—31—34 as the second group, and the gearing 40—41—43 as the third group.

The preceding described arrangement of gears with respect to the fluid turbine clutch appears in my S. N. 124,283, filed February 5, 1937.

The showing of Figure 4 describes a second arrangement which partakes of the general torque handling properties of the first arrangement, but possesses features of novelty representing primarily a gain in the ranges of available speed ratios to be derived for a given size of gearbox. The gains are obtained by the peculiar gearing combination of the epicyclic trains adjacent the output shaft, that is, in the second and third groups of gear units.

The first or primary train performs identical functions in both arrangements. It serves to couple or connect the engine flywheel 2 directly with the first rotor, at one-to-one ratio, or to connect them at reduced speed ratio, determined by the application of brake 46 or clutch 20—21.

It has not been deemed necessary to show the whole gearbox combination in Figure 4, since the elements connected at the left to the hollow shaft 11 and solid shaft 5 are the same in both arrangements.

In Figure 4 hollow shaft 11 is fixed to or integral with clutch drum 22, splined to clutch plates 23 mating with plates 24, rotating with drum 25a.

Internal shaft 5 is fixed to or integral with sun gear 40a, and is spigoted in a central recess of output shaft 50 at pilot bearing 45. Output shaft 50 is attached to carrier 79 of the second epicyclic group, the planet gears 81 of which mesh with sun gear 40a and annulus gear 80, fixed to drum 25a.

A second output connected carrier 82, that of the third, or reversing epicyclic group, rotates with shaft 50, and supports planet gears 83 which mesh internally with sun gear 84 affixed to drum 25a, and externally with annulus gear 85 rotating with drum 86. The latter drum is toothed at 88 in order to be prevented from rotating by a cooperating pawl device, when reverse rotation of shaft 50 is required. The reverse drum locking mechanism is described in Figure 5.

Brake band 47a locks drum 25a, exactly as band 47 prevents rotation of drum 25 in Figure 1. The structure of Figure 5 replaces that of the brake 49 of Figure 1, as will be understood from the further description.

In the first arrangement, the shaft 5, rotating with disc 6 of the fluid turbine, is connected to annulus gear 34 and sun gear 40, so that the recombining of torques, when the clutch 23—24 is applied, occurs through one component being applied to carrier 39 by sun gear 40, derived from rotation of disc 6, another component applied to annulus gear 34, and a third component through sun gear 30, the combined first and second components being applied to carrier 39 through drum 36 connecting it to carrier 33. The final output torque on annulus gear 43 is then the resultant of differential torques divided at the fluid turbine to hollow shaft 11 and solid shaft 5; a first combining occurring through the gear group 30, 31 and 34 to carrier 33; and a second combining occurring through the gear group 40, 41 and 43, resulting from differential rotations applied to carrier 39 and sun gear 40.

In the second arrangement, the torque of hollow shaft 11 through clutch 23—24 is applied to annulus gear 80; of solid shaft 5 to sun gear 40a, the carrier 79 for planets 81 meshing therewith driving the output shaft 50 directly at a ratio representing the summation of the differential rotations of annulus gear 80 and sun gear 40a.

It is desirable that the user of this general form of multiplex gearing be able to choose the specific ratios for the differential rotation conditions so that two purposes be served; first, that the gearing for a minimum volumetric space allotment yield a sufficiently low gear for obtaining maximum advantage of utility with a predetermined power of engine, and second, that selection can be made for the differential rotation characteristic for a ratio of drive such that whatever friction losses therein may be restricted to the least used gear ratio. In the present example, the second arrangement of Figure 4 puts the maximum differential characteristic in the reverse gear drive, as will be understood in the following description of the operation.

In the first arrangement, the double differential method of combining torque is utilized for the low speed forward, and the reverse ratio is a simple planetary reversal, the input torque being delivered at sungear 40, and output taken from the annulus gear 43; when brake 49 on drum 36 is applied, stopping rotation of the carrier 33 for planets 31. No torque is delivered from shaft 11 to sun gear 30 when reverse gear drive is desired.

In the second arrangement, the double differential method of combining torques is used to obtain the reverse rotation of output shaft 50, and the low forward component is derived through the simple planetary action by locking brake 47a on drum 25a, stopping rotation of annulus gear 80; the input torque on shaft 5, and sun gear 40a causing reduced speed rotation of carrier 79 attached to output shaft 50.

It has been found advantageous to use the double differential characteristic in the least used gear ratio for the reason that whatever friction losses need be entailed therein as compared with the simple planetary arrangement, are only experienced for comparatively short periods of use.

A further advantage is obtained in the second arrangement, namely, the range of available low gear ratios, both forward and reverse, allows the designer to make use of greater mechanical advantage, or greater torque multiplication, than in the first arrangement, for a given size of annulus gears.

It should be noted that for a given torque to be carried, at reduced speed ratios, this composite form of gear provides a selection of low gear ratios not only commensurate with, but also considerably lower than obtainable in present day motor vehicle practice. This general gear form then is only limited by the external dimensional requirements, which, of course, control the permissable diameter of the annulus gears 80 and 85, their drums 25a and 86, and by the permissable relative speeds of the planets gears 81 and 83. It will be observed that in the second arrangement, the absolute planet speeds of rotation on their own centers is much less than in the first arrangement, for a given speed ratio in reverse.

In the first, the planets 31 of the second group are idling in reverse, and in the second arrangement, the corresponding planets 81 are actually under load. The secondary planets are under load in both arrangements in reverse speed ratio.

With the second arrangement of Figure 4, as in the first arrangement of Figure 1, the speed ratio range pattern of Figure 3 results.

Figure 5:
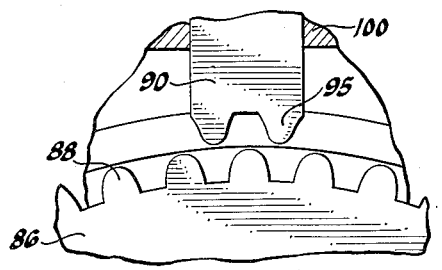
Figure 5 is a view at 5—5 of Figure 4, of the parts involved in actuation of reverse gear drive.

The brake and clutch control combinations are essentially the same as for the first arrangement except the modification of Figures 4 and 5 which shows a means to lock annulus gear 85 against rotation, its drum 86 having teeth 88 which are engaged by pawl 90, when the operator desires to drive in reverse. At this time the brake 47a is released from drum 25a, and clutch 23—24 of the second group is also released. For normal drive in reverse, brake 46 of the first group is locked, so that the engine may be coupled to the drive gear through the fluid coupling 6—7.

In Figure 5 casing 100 is cast in the form of a cylinder such as shown at 91, with a square aperture opening into the casing 100 through which toothed portion 90a of pawl 90 projects to engage teeth 88 of drum 86. Retracting spring 93 normally holds pawl teeth 95 clear of drum teeth 88. Fluid pressure through passage 96 and port 97 is admitted to the under side of piston shaped portion 90b of the pawl 90, overcoming the spring 93, and meshing pawl teeth 95 with ring of teeth 88. When the fluid pressure is released by the operator's external controls, spring 93 withdraws the pawl 90, and annulus drum 86 is free to turn. This method of controlling reaction for reverse drive is believed useful and unique. This method enables the designer to obtain positive reverse drive conditions by fluid pressure controls, the master station of which is remotely located. Pawl 90 is a simple unitary member having only reciprocating movement, reducing to a minimum the chance of mechanical failure. It will be noted that the teeth 95—88 of pawl 90 and drum 86 mesh by radial motion, and are cut with proper tooth contours so that the hazard of end-on abutment with failure to mesh is dispensed with.

In practice, the pawl 90 being non-rotatable, and the drum 86 being subject to incremental drag rotation from the engine, it has been found that when fluid pressure is exerted during the pre-mesh interval, should there be a small rotational component on drum 86, there is sufficient action under dynamic rather than static friction at the engaging faces of teeth 95—88 to provide smooth seating without clatter. If drum 86 has a considerable speed, or a given component too great for proper mesh, it is possible for the inclined tooth faces to reject mesh, and for the pawl to be thrust outward radially so that reverse cannot be engaged. In normal operation, however, this latter condition is not encountered, since the vehicle operator will not ordinarily be endeavoring to shift to reverse except when the engine and output shafts are both at low speed of the output shaft stopped. This low speed component on drum 86 is not rigidly applied, and the pawl teeth are able to seat and lock because of the yielding characteristic of the fluid drive at low speed.

If the vehicle is moving slowly forward or standing still, with the engine idling, with brake 46 locked, brake 47a releasing, and pawl 90 about to be loaded, the drag conditions in the transmission are: first, that rotor 7 is being rotated forward at less than existing engine speed. Since clutch 23—24 is disengaged and brake 47a released, no input component except by drag of plates 23—24 can be applied directly to annulus gear 80 or sun gear 84 of drum 25a. Fluid drag between rotors 6 and 7 may apply a small component to shaft 5 and sun gear 40a, greater than that through 23—24, tending to rotate drum 25a backward at reduced speed, thereby tending to rotate drum 86 forward at a greater reduction of speed in the direction of rotation of engine and shaft 50, these speeds, of course, being related to the existing engine speed.

When the pawl 90 begins to seat in teeth 88, the drum teeth will still have a forward rotational tendency, such as they will be required to sustain for providing reverse driving reaction, when they are fully locked with the pawl 90.

This facilitates the operation sometimes required for rocking a car out of a low-traction situation, by quickly alternating low forward with reverse drive.

The torque reaction values on the teeth 95—88 are predetermined so that the fluid pressure sustained against plunger 90a is always sufficient to hold the reverse ratio, and the teeth faces are contoured so that immediately upon release of fluid pressure, the force of spring 93, and the tooth form permit quick demeshing of the pawl with the ring of teeth 88.

This permits the fluid pressure to be applied to brake 47a by the structure of Figure 2 while it is being relieved from cylinder 91, since the braking of drum 25a will tend to rock the teeth 88 from a backward reaction sustaining position to a no-torque position. The loading on teeth 95 of the pawl 90 then is transferred from one face to the opposite face, in the interval of which the spring 93 may become effective to lift pawl 90 clear of meshing engagement.

The overall characteristics of my invention are principally derived from the unique combination of the closed-circuit, two-element fluid turbine with the gearing and the control devices therefor, of my disclosure. The well-known fluid efficiency losses of the turbine device are limited to a small range of torque values to be handled, the dividing of the torques, and their recombination in positive gearing enabling the designer to attain, for practical purposes, a smoothness of operation with step gearing comparable with infinitely variable gearings.

The above description is believed to set forth clearly the achieving of the various stated objects of the invention, and to describe the advantageous results derived therefrom.

Be it understood that one skilled in the art may make substitutions for the elements of my invention without departing from the spirit thereof, or from the statements of the invention in the appended claims.

I claim:

1. In multiple speed drives, in combination, a power shaft, a casing rotated by said shaft, a chamber formed in said casing, a two-element fluid coupling occupying said chamber, a first gear group embodying an annulus gear driven by said casing, a carrier supporting planet gears meshing with said annulus, a reaction sun gear meshing with said planet gears; a secondary shaft attached to said carrier and to one of the elements of said coupling, an intermediate shaft attached to the other of said elements; a load shaft; a second gear group comprising a carrier attached to said load shaft, a sun gear driven by said intermediate shaft, an annulus adapted to be driven by said secondary shaft, and a clutch operative to connect and disconnect said annulus to and from said secondary shaft for establishing compound drive between said power and load shafts through said fluid coupling and said gear groups, and for disengaging said compound drive.

2. In compounded variable speed transmission systems, in combination, a driving shaft and a driven shaft coupled by a variable speed step-ratio gearing which includes in associative assembly a first gear group coupled directly to said driving shaft, a second gear group, a third gear group, the said groups being interconnected mechanically for the transmission and recombining of divided torque values between said shafts, a fluid turbine coupling arranged to connect one of the elements of said first gear group with one of the elements of one of the other two groups for establishing torque coupling relationships between the said groups and adapted to divide the torque between the said groups, actuating means for changing the ratio of each of said groups, the actuating means for said first two named groups being adapted to maintain continuous torque between said shafts during the changes of forward driving ratio, and control means for said actuating means adapted to establish a succession of forward driving ratios by actuation of the said actuating means for the first two of said groups, wherein the actuating means for a new forward driving ratio is energised prior to the release of the actuation means for the priorly established forward driving ratio.

3. In compound epicyclic gearing, in combination, an engine, a first epicyclic group receiving drive from the engine and adapted to drive an output member at one of two speed ratios, a second epicyclic group having an annulus adapted to receive a torque from the output member of the first named group, and having a sun gear adapted to receive a second torque value by a different path from that received from said member, a fluid turbine, one element of which is connected to the output member of said first named group, and a second element of which is connected to said sun gear, a load shaft connected to receive the combined torques of said annulus and said gear, a clutch operative to connect and disconnect said annulus with and from said member for one speed ratio of drive, and a brake effective to prevent the rotation of said annulus for establishing a different speed ratio of drive when said clutch is released.

4. In composite step-ratio transmission systems, in combination, an engine, a first gearing group connected directly to the engine, a second gearing group, a third gearing group, each of said groups having an annulus, sun gear, planet gears and a carrier for said planet gears, a fluid turbine one element of which is connected to receive drive at either of two fixed speed ratios of said first named group, another element of which is arranged to drive the sun gear of said second gear group, a clutch adapted to connect said first named turbine element with the annulus of said second group, a brake arranged to stop the rotation of said annulus when said clutch is disconnected, a load shaft permanently connected with the carrier of said second named group, and actuating means for said clutch and said brake alternatively operative to compel drive in one or another speed ratio when said actuating means is alternately made effective.

5. In composite transmission systems, in combination, an engine, a first gearing group connected directly to said engine, a second gearing group, a third gearing group, each of said groups having an annulus gear, planet gears, a sun gear and a carrier for said planet gears, a fluid turbine coupling the carrier of said first named group to the sun gear of said second named group, a load shaft connected to the carriers for said second and third named groups, a drum connecting the annulus of the said second group with the sun gear of said third group, means to lock the sun gear of said first group and the annulus of said second named group against rotation for establishing forward drive at low speed ratio, and means to lock the annulus of said third named group when the annulus of said second named group is unlocked, for obtaining reverse rotation of said load shaft by compound rotation of said drum.

6. In compound power transmission systems, in combination, an engine directly driving a compound step-ratio gearing assembly composed of three groups each of which has three relatively rotatable members, individual braking means adapted to stop the rotation of one member of each of the groups for establishing reaction therein, a clutching means adapted to couple the input and output members of the first of said groups for solid drive, a clutching means adapted to couple the output member of said first group with a member of said second group for unitary rotation, a load shaft drivingly connected with the output member of said second group, and a two-element fluid turbine coupling the output member of said first group with one of the members of said second group, for transmitting the drive over a predetermined range of slip ratios between the output member of said first group and the said member of said second group.

7. In compound power transmission systems, in combination, a step-ratio epicyclic gearing assembly comparing three gear groups each having an annulus, a sun gear and planet gears supported by a carrier, a reaction brake for locking the sun gear of the first of said groups against rotation, a fluid coupling effective to transmit a slipping drive between the carrier of said first group and the sun gear of said second group, a clutch operative to transmit the drive of said first group carrier to the annulus of said second group, a drum permanently connecting the annulus of said second group with the sun gear of said third group, a loadshaft permanently connected to the carriers of said second and third groups, and a positive locking device effective to stop the rotation of said annulus gear of said third group when the reaction brake of said first group is locked for establishing reverse drive at low gear ratio between said shafts, conditioned by the slip factor of said fluid coupling.

8. In compound power transmission systems, in combination, an engine, a load shaft arranged to receive continuous forward drive at selected speed ratios therefrom, a first epicyclic gear group driven directly by said engine and adapted to drive its carrier at one of two speed ratios, a fluid coupling one element of which rotates with said carrier, a second epicyclic group connected to drive said loadshaft forwardly by combining the ratio of drive from said carrier with a driving component derived through rotation imparted through said fluid coupling to an element of said second group, and actuating means controlling the ratio of drive of said carrier from said engine in said first named group for providing one of two ratios of speed between said engine and said load shaft.

9. In compound power transmission systems, in combination, an engine, a two-speed gear unit constantly coupled to said engine and having an output member, a fluid turbine one rotor of which rotates with said member, a second gear unit having one element adapted to rotate with said member and having a second element connected to rotate with another rotor of said turbine, a load shaft connected to a third element of said second named gear unit for rotation at a speed differential to the speeds imparted to the first and second elements of said second named gear unit, and actuation control means effective to change the speed ratio of said member for providing a change of forward driving ratio between said engine and said shaft without release of torque therebetween.

10. In compound power transmission systems, in combination, two epicyclic gear units each having rotatable input, output and reaction members, a fluid turbine adapted to couple the output member of the first of said units with a member of the second of said units, coupling means adapted to transmit the drive of the output member of the first of said units to a second member of said second unit, and a load shaft connected to the output member of said second unit for rotation at a differential of speed resulting from the rotation imparted by said turbine to the first named member of said second unit and by said coupling means to the second member of said second unit.

11. In compound power transmission systems, in combination, two epicyclic gear units each having rotatable input, output and reaction members, a fluid turbine adapted to couple the output member of the first of said units with a member of the second of said units, coupling means adapted to transmit the drive of the output member of the first of said units to a second member of said second unit, a load shaft connected to the output member of said second unit for rotation at a differential of speed resulting from the rotation imparted by said turbine to the first named member of said second unit and by said coupling means to the second member of said second unit, and actuation control means for said coupling means.

12. In compound power transmission systems, in combination, an engine, two epicyclic gear units each having rotatable input, output and reaction members, the input of the first of said units being directly connected to said engine, separate breaking means for each of said reaction members, a fluid turbine permanently coupling the output member of the first of said units with a member of the second of said units, coupling means adapted to transmit the rotation of the output member of the first of said units to the reaction member of said second unit when the brake for said reaction member is inactive, coupling means adapted to lock the members of said first unit for unitary drive at engine speed when the reaction member of the first unit is not locked by said breaking means, a load shaft rotating with the output member of said second unit, and actuating means for both said coupling and said breaking means adapted to be controlled in combinations yielding four different forward driving ratios between said engine and said shaft.

13. In compound power transmission systems, in combination, an engine, two epicyclic gear units each having rotatable input, output and reaction members, the input of the first of said units being directly connected to said engine, separate breaking means for each of said reaction members, a fluid turbine permanently coupling the output member of the first of said units with a member of the second of said units, coupling means adapted to transmit the rotation of the output member of the first of said units to the reaction member of said second unit when the brake for said reaction member is inactive, coupling means adapted to lock the members of said first unit for unitary drive at engine speed when the reaction member of the first unit is not locked by said braking means, a load shaft rotating with the output member of said second unit, actuating means for both said coupling and said braking means adapted to be controlled in combinations yielding four different forward driving ratios between said engine and said shaft, and a plurality of fluid pressure control devices effective to compel the establishing of said four forward driving ratios at the will of the operator.

14. In compound power transmission systems, in combination, an engine, two epicyclic gear units each having rotatable input, output and reaction members, the input of the first of said units being directly connected to said engine, separate braking means for each of said reaction members, a fluid turbine permanently coupling the output member of the first of said units with a member of the second of said units, coupling means adapted to transmit the rotation of the output member of the first of said units to the reaction member of said second unit when the brake for said reaction member is inactive, coupling means adapted to lock the members of said first unit for unitary drive at engine speed when the reaction member of the first unit is not locked by said braking means, a load shaft rotating with the output member of said second unit, actuating means for both said coupling and said braking means adapted to the controlled in combinations yielding four different forward driving ratios between said engine and said shaft, and control means operative to establish neutral drive by rendering all of said braking and coupling means inactive.

15. In compound power transmission systems, in combination, an engine, two epicyclic gear units each having rotatable input, output and reaction members, the input of the first of said units being directly connected to said engine, separate braking means for each of said reaction members, a fluid turbine permanently coupling the output member of the first of said units with a member of the second of said units, coupling means adapted to transmit the rotation of the output member of the first of said units to the reaction member of said second unit when the brake for said reaction member is inactive, coupling means adapted to lock the members of said first unit for unitary drive at engine speed when the reaction member of the first unit is not locked by said braking means, a load shaft rotating with the output member of said second unit, actuating means for both said coupling and said braking means adapted to be controlled in combinations yielding four different forward driving ratios between said engine and said shaft, and control means operative in shifting from one forward speed ratio to another to maintain continuous torque between said engine and said load shaft.

16. In torque multiplying drive systems, in combination, an engine, two epicyclic gear units each having rotatable input, output and reaction members, the input of the first unit being directly driven by said engine, a load shaft rotating with the output member of the second unit, a third epicyclic unit having input and reaction members, its output member likewise rotating with said load shaft, individual braking means for each of said reaction members, a fluid turbine coupling the output member of the said first unit with the input member of the said second unit, coupling means arranged to transmit the rotation of the output member of the first of said units to the reaction member of said second unit, coupling means adapted to couple the output and reaction members of the said first unit for unitary rotation at engine speed, and actuating means for said braking and said coupling means adapted to be controlled in combinations yielding four different forward driving ratios and reverse drive at low ratio between said engine and said shaft.

17. In torque multiplying drive systems, in combination, an engine, two epicyclic gear units each having rotatable input, output and reaction members, the input of the first unit being directly driven by said engine, a load shaft rotating with the output member of the second unit; a third epicyclic unit having input and reaction members, its output member likewise rotating with said load shaft, individual braking means for each of said reaction members, a fluid turbine coupling the output member of the said first unit with the input member of the said second unit, coupling means arranged to transmit the rotation of the output member of the first of said units to the reaction member of said second unit, coupling means adapted to couple the output and reaction members of the said first unit for unitary rotation at engine speed, actuating means for said braking and said coupling means adapted to be controlled in combinations yielding four different forward driving ratios and reverse drive at low ratio between said engine and said shaft, and control means acting selectively upon said braking and coupling means through the agencies of said actuating means, effective to lock the reaction means of said first and third units only for reverse drive between said engine and said shaft at low gear ratio.

18. In torque multiplying drive systems, in combination, an engine, two epicyclic gear units each having rotatable input, output and reaction members, the input of the first unit being directly driven by said engine, a loadshaft rotating with the output member of the second unit; a third epicyclic unit having input and reaction members, its output member likewise rotating with said load shaft, individual braking means for each of said reaction members, a fluid turbine coupling the output member of the said first unit with the input member of the said second unit, coupling means arranged to transmit the rotation of the output member of the first of said units to the reaction member of said second unit, coupling means adapted to couple the output and reaction members of the said first unit for unitary rotation at engine speed, actuating means for said braking and said coupling means adapted to be controlled in combinations yielding four different forward driving ratios and reverse drive at low ratio between said engine and said shaft, and a control means for the reaction locking brake means of the said third unit comprising a positively locking bolt.

19. In torque multiplying drive systems, in combination, an engine, two epicyclic gear units each having rotatable input, output and reaction members, the input of the first unit being directly driven by said engine, a load shaft rotating with the output member of the second unit; a third epicyclic unit having input and reaction members, its output member likewise rotating with said load shaft, individual braking means for each of said reaction members, a fluid turbine coupling the output member of the said first unit with the input member of the said second unit, coupling means arranged to transmit the rotation of the output member of the first of said units to the reaction member of said second unit, coupling means adapted to couple the output and reaction members of the said first unit for unitary rotation at engine speed, actuating means for said braking and said coupling means adapted to be controlled in combinations yielding four different forward driving ratios and reverse drive at low ratio between said engine and said shaft, and fluid pressure means arranged operative to supply the said actuating means in accordance with the said control combinations.

20. In composite step-ratio transmission systems, in combination, an engine, a first gearing group connected directly to the engine, a second gearing group, a third gearing group, each of said groups having an annulus, sun gear, planet gears and a carrier for said planet gears, a fluid turbine one element of which is connected to receive drive at either of two fixed speed ratios of said first named group, another element of which is arranged to drive the sun gear of said second gear group, a clutch adapted to connect said first named turbine element with the annulus of said second group, a brake arranged to stop the rotation of said annulus when said clutch is disconnected, a load shaft permanently connected with the carrier of said second named group, reaction locking means for each of the three said groups, a clutch adapted to couple the annulus, sun gear and carrier of the first named unit for unitary rotation, actuation means for said reaction locking means and said clutches, and control means operative to provide individual or grouped actuation of any of said locking means or said clutches.

21. In a drive transmitting arrangement for motor vehicles, an engine, a load shaft, a torque coupling mechanism including a fluid flywheel unit and a variable speed ratio gear transmission group adapted to transmit uninterrupted torque during forward drive between said engine and said load shaft, said fluid flywheel unit comprising input and output members, said transmission group consisting of a plurality of gear units the first one of which is arranged to couple the input member of said fluid flywheel unit for unitary or for reduced speed with respect to the speed of said engine, and another of which gear units is arranged to couple the said load shaft with the output member of said fluid flywheel unit, actuation means for establishing changes of speed ratio in each of said gear units of said variable speed ratio gear transmission group, and control means for said actuation means adapted to establish a forward drive sequence of speed ratio changes wherein the lower speed ratio is established for initial drive while said first named gear unit is coupled to said input member of said fluid flywheel unit for reduced speed, providing a reduction speed to the said input member.

22. In drive transmitting arrangements for motor vehicles, a power shaft and an output shaft, a variable speed transmission mechanism coupling said shafts arranged for division of input torque and adapted to recombine divided torque before delivery to said output shaft, actuation means for said mechanism for establishing a sequence of driving speed ratios therein, control means for said actuation means effective to select coupled ratios of drive by said mechanism, and a fluid turbine drive transmitting unit coupled to said mechanism and operative to divide the input torque thereto for predetermined coupled ratios selected by said control means and established by said actuation means.

23. In compound drive coupling devices for motor vehicles, an engine shaft, a load shaft, a variable speed transmission mechanism adapted to transmit a multiplicity of speed ratios between said shafts, certain of said ratios being obtained by compound coupling of relatively rotatable elements of said mechanism, actuation means for said mechanism adapted to establish a sequence of reduction speed ratios and direct drive therein, control means for said actuation means arranged to select reduction and direct drive by said mechanism, and a fluid turbine unit having an input and an output member, said members being both coupled to elements of said transmission mechanism partaking of said compound coupling, and arranged to establish and sustain the said direct drive through the fluid turbine coupling caused by rotation of said members.

24. In drive transmitting arrangements for motor vehicles, an input and an output shaft, a variable speed ratio transmission mechanism adapted for dividing and recombining torque between said shafts and having two relatively rotatable elements coupled for delivering recombined torque to said output shaft, controls for said mechanism effective to establish a sequence of speed ratios therein, and a fluid turbine unit comprising two relatively rotatable members and coupled with said mechanism for respective unitary rotation with said two relatively rotatable elements when said controls establish the highest of said sequence of speed ratios of said transmission mechanism.

OLIVER K. KELLEY.